(12) United States Patent
Koivuniemi

(10) Patent No.: US 6,393,518 B2
(45) Date of Patent: *May 21, 2002

(54) CONTROLLING SHARED DISK DATA IN A DUPLEXED COMPUTER UNIT

(75) Inventor: Pekka Koivuniemi, Hyvinkää (FI)

(73) Assignee: Nokia Telecommunications Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,195

(22) PCT Filed: Sep. 13, 1996

(86) PCT No.: PCT/FI96/00484

§ 371 Date: Mar. 13, 1998

§ 102(e) Date: Mar. 13, 1998

(87) PCT Pub. No.: WO97/10552

PCT Pub. Date: Mar. 20, 1997

(30) Foreign Application Priority Data

Sep. 14, 1995 (FI) .................................................. 954333

(51) Int. Cl.[7] ............................................. G06F 12/14
(52) U.S. Cl. ......................... 711/113; 711/151; 711/152
(58) Field of Search ................................ 711/113, 147, 711/150, 151, 158, 152

(56) References Cited

U.S. PATENT DOCUMENTS

| 4,164,787 | A | | 8/1979 | Aranguren | 713/600 |
|---|---|---|---|---|---|
| 4,410,944 | A | | 10/1983 | Kronies | 711/147 |
| 4,780,812 | A | | 10/1988 | Freestone et al. | 711/149 |
| 4,959,777 | A | * | 9/1990 | Holman, Jr. | 711/141 |
| 5,072,369 | A | | 12/1991 | Theus et al. | 711/146 |
| 5,287,473 | A | | 2/1994 | Mohan et al. | 711/133 |
| 5,341,491 | A | * | 8/1994 | Ramanujan | 711/152 |
| 5,408,653 | A | * | 4/1995 | Josten et al. | 707/8 |
| 5,568,617 | A | * | 10/1996 | Kametani | 711/151 |
| 5,574,902 | A | * | 11/1996 | Josten et al. | 707/1 |
| 5,699,553 | A | * | 12/1997 | Iino et al. | 711/151 |
| 5,809,278 | A | * | 9/1998 | Watanabe et al. | 711/150 |

FOREIGN PATENT DOCUMENTS

| EP | 0 240 616 | 10/1987 |
|---|---|---|
| EP | 0 499 422 | 8/1992 |

OTHER PUBLICATIONS

Copy of International Search Report.

* cited by examiner

*Primary Examiner*—Reginald G. Bragdon
(74) *Attorney, Agent, or Firm*—Pillsbury Winthrop LLP

(57) ABSTRACT

In fault-tolerant systems it is known to write data into two separate disk drives. It is also known to duplex computers so that when one computer fails, the other computer can continue operating. In such a system, the active unit usually controls both disk drives. It is also known to cache in the main memory of the computer the most recently used areas in the disk drive, since it is likely that these areas (e.g. directories) must be read again soon. A problem occurs when using duplexed computers each of which is to be provided with a possibility of using the disk drive (14, 24) while the operation is expedited by caching in the main memories of the computers (10, 20). If one computer modifies the data in the disk drive, the other computer is not necessarily aware of this, but it uses the outdated data in its memory. According to the invention, the computer (10) desiring to control the disk drive (14) reserves it for itself. If the reservation is successful, a disk talk is performed. If the data in the disk drive (14) is changed, the other computer (20) is informed of this change and it erases from its memory the cached data corresponding to the changed data.

6 Claims, 1 Drawing Sheet

CONTROLLING SHARED DISK DATA IN A DUPLEXED COMPUTER UNIT

FIELD OF THE INVENTION

The invention relates to duplexed computer systems and especially to an arrangement with which two computer units can control data on the same disk drive.

BACKGROUND OF THE INVENTION

In fault-tolerant systems that are used for example in switching centres, it is previously known to write data into two separate disk drives. It is also previously known to duplex computers so that when one computer unit fails, the other computer may continue the operation. In such a system, the active unit controls both disk drives. The passive unit is either in reserve or faulty, but it does not usually control the disk drives. It is also previously known to store in the main memory of the computer such areas of the disk drive that were read last, since it is likely that at least some of these areas (for example directories) must be read again soon.

With reference to FIG. 1, duplexed computers are usually arranged in such a way that only one (e.g. 10) of the computers 10 and 20 uses a disk drive 14 and/or a disk drive 24. The other computer (in this case 20) is then in reserve or faulty. A first disk drive bus 15 connects both computer units and the first disk drive 14. Correspondingly, a second disk drive bus 25 connects both computer units and the second disk drive 24. FIG. 1 shows an embodiment where each computer unit 10 and 20 comprises two disk drive controllers 13a and 13b, and 23a and 23b, respectively. Alternatively, each computer unit 10 and 20 might comprise one disk drive controller having two separate interfaces to the disk drive buses 15 and 25. The disk drive buses 15 and 25 may be for example SCSI (Small Computer Systems Interface) buses and the disk drives 14 and 24 may correspondingly be disk drives with SCSI interfaces. FIG. 1 also shows a bidirectional message bus 30 connecting the computers 10 and 20. Via the message bus 30 the computers 10 and 20 interchange maintenance messages, for example they inquire about each other's condition etc.

The system of FIG. 1 is shown with two disk drives 14 and 24 since in duplexed systems the disk drives are usually also duplexed. In this exemplary case, the disk drive buses have also been duplexed. As far as the invention is concerned, the disk drives 14 and 24 could also be connected to a common disk drive bus 15 or 25. However, the invention relates to controlling disk drives regardless of any other disk drives that the system may comprise. The number of disk drives and disk drive buses is therefore not essential to the invention.

Caching the data of the disk drive 14 in the main memory 12 of one computer 10 constitutes technology that is known to a person skilled in the art. The caching is based on the empirical observation that when a disk task is performed to some part of the disk drive 14, it is likely that another disk task is performed relatively soon to the same part. Therefore it is preferable to store in the main memory 12 the data corresponding to some of the most recently used areas of the disk drive 14. For the purpose of caching a disk drive, a certain area is usually reserved from the main memory 12. Alternatively, the disk drive controllers 13a and 13b may contain a separate cache memory.

A problem occurs with the use of duplexed computers each of which is to be provided with the possibility of using at least one disk drive 14 and 24 while the operation is expedited by caching the disk drive in the main memories 12 and 22 of the computers 10 and 20. If one computer unit (e.g. 10) modifies the data on the disk drive 14, the other computer unit (in this case 20) is not necessarily aware of it. If this computer 20 relies on the cached data in its main memory without reading the recently updated data from the disk drive 14, the system gets confused. Due to fault-tolerance, the computer units 10 and 20 have separate main memories, so that the computers 10 and 20 cannot write directly into each other's main memories which areas in the disk drive 14 they have changed.

SUMMARY OF THE INVENTION

On the basis of the above, the object of the invention is to provide a method and a system with which two computer units can cache data in a shared disk drive in a reliable manner. The aims of the invention are achieved with methods and systems that are characterized by what is disclosed in the independent claims. The preferred embodiments are set forth in dependent claims.

The invention is based on the idea that a computer unit desiring to use a disk drive makes sure that another computer does not use the disk drive simultaneously, whereafter the computer checks if the other computer has modified any of the data in the disk drive. If the data in the disk drive has been changed, the cached data corresponding to this data is erased from the main memory. After this, a disk task is performed and the other computer unit is informed of the changed data in the disk drive.

The method and system according to the invention have the primary advantage that shared disk data can be controlled from two computers so that data can still be cached in the main memories of the computers. Also, the invention only requires few additions to the disk control software in order to be realized. The equipment does not usually have to be altered, considering the changes that would be required in any case by the duplexing of the computer system.

BRIEF DESCRIPTION OF THE DRAWING

The invention will be described in greater detail in connection with preferred embodiments and with reference to FIG. 1 illustrating a duplexed computer unit comprising duplexed disk drives.

DETAILED DESCRIPTION OF THE INVENTION

Figure 1:
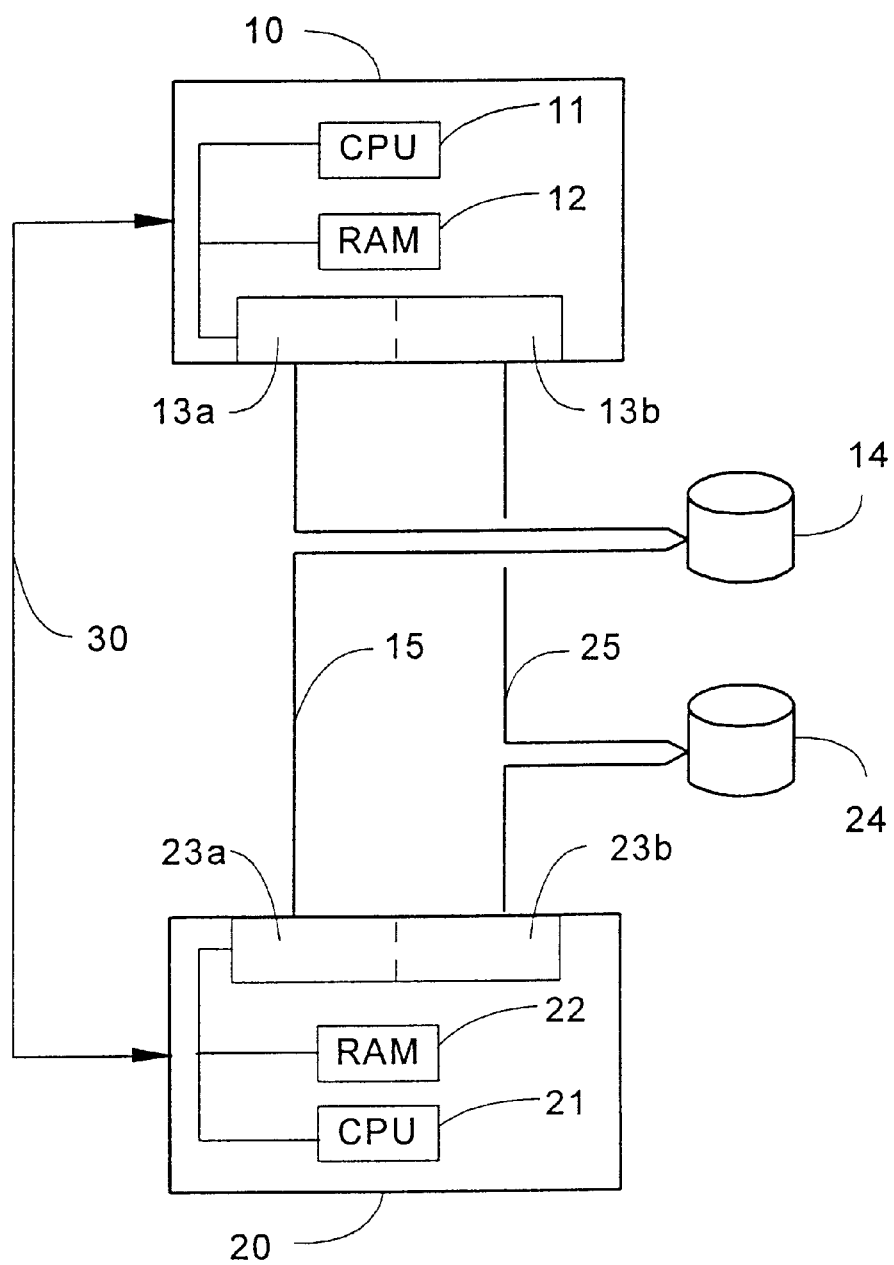

The method according to the invention for controlling a shared disk drive 14 from two computers 10 and 20 can be performed in the system shown in FIG. 1 for example in the following steps. Assume that the first computer 10 wants to use the first disk drive 14. Due to the system symmetry, the method operates in a corresponding manner from the other computer.

(i) It is checked whether the other computer 20 has sent notices of the changes it has made in the disk drive 14;
(ii) if the other computer 20 has sent notices of the changes it has made in the disk drive 14, the caching of the data corresponding to the changed areas in the disk drive 14 is erased;
(iii) a disk task is performed;
(iv) if the data in the disk drive 14 is changed in the disk task, the other computer is informed of the changed areas in the disk drive 14.

The disk task may include several commands to the disk drive 14. During this process the other computer 20 must be prevented in some way from using the disk drive 14. This is performed most advantageously in such a way that before the disk task the first computer 10 reserves the disk drive for itself for example with the SCSI command RESERVE. Correspondingly, the disk drive can be released after the disk task with the SCSI command RELEASE. The disk drive can be released after each disk task. The release may alternatively take place only when the other computer indicates that it needs to access the disk drive. This indication of the need for the disk drive can be forwarded either via the message bus 30 or the disk drive bus 15.

If the computer 10 does not manage to reserve the disk drive 14, the other computer 20 has reserved the disk drive. The first computer 10 may then transmit to the second computer 20 an indication that it needs the disk drive 14. After this the first computer 10 may try to reserve the disk drive 14 again.

The number or total duration of new attempts is preferably limited to a predetermined value. This predetermined time is selected such that the other computer 20 should be able to complete its disk task within this time and it should release the disk drive 14. Alternatively, there may be two predetermined time limits. The shorter time limit (for example 5 seconds) is used for short reservations, and the longer one (which may be several minutes) is used for long reservations, for instance during formatting and packing the disk drive.

Unless the other computer 20 releases the disk drive 14 in a time corresponding to the predetermined limit, an inquiry can be sent to this computer 20 asking if it has reserved the disk drive 14. Unless an expected answer is received for this inquiry, it is concluded that the other computer 20 has become faulty while performing a disk task. In this case, a reset command is transmitted to the disk drive 14 and a new attempt for reservation is performed.

According to an embodiment of the invention, all signalling both between the computers 10 and 20 and from the computers to the disk drive 14 takes place via the disk drive bus 15. This embodiment is applicable especially when using disk drives with SCSI interfaces, since an SCSI comprises well defined protocols by means of which also other commands, besides the commands traditionally related to disk drives, can be transmitted. The SCSI version II is defined in the ANSI standard X3.141-1994.

According to another embodiment of the invention, the signalling between the computers 10 and 20 takes place via a message bus that is separate from the disk drive bus. This separate message bus 30 is shown in FIG. 1.

The method according to the invention is realized most preferably as a part of the disk control software of a duplexed computer system. The additions according to the invention to the disk control software are stored in the memory in which the rest of the disk control software is stored. If the signalling according to the invention between the computers is performed via a message bus that is separate from the disk drive bus and that connects the computers, this message bus does not necessarily constitute known technology. On the basis of the above description, it is apparent for a person skilled in the art how the signalling on the message bus is complemented in order to implement the method according to the invention.

From the above description it is also obvious for a person skilled in the art that as the technology advances, the basic idea of the invention can be realized in many different ways. The invention and the embodiments thereof are therefore not restricted to the above-described examples, but they may vary within the scope of the claims.

What is claimed is:

1. A method of controlling a shared disk drive in a duplexed system comprising first and second computers, a shared disk drive, the first computer comprising a memory for caching selected data in the shared disk drive, and a disk drive bus connecting the computers and the shared disk drive, the method comprising the following steps performed by the first computer attempting to perform a disk task to the shared disk drive:

checking if the second computer has sent to the first computer a notice of changes it has made in the shared disk drive;

in response to detection of the notice, erasing from the memory of the first computer data corresponding to the areas in the shared disk drive that the second computer has changed;

attempting to reserve the disk drive;

if the attempt is successful, performing the disk task, informing the second computer about the areas in the shared disk drive that have been changed by the disk task, and after the disk task, releasing the disk drive;

if the attempt is unsuccessful, sending the second computer an indication that the disk drive is needed; and releasing the disk drive by a reset operation if the second computer does not provide an expected answer to the indication in a predetermined time.

2. A method as claimed in claim 1, wherein the first and second computers communicate via the disk drive bus.

3. A method as claimed in claim 1, wherein the first and second computers communicate via a message bus that is separate from the disk drive bus.

4. A duplexed computer system for controlling a shared disk drive from first and second computers, at least the first computer comprising a cache memory for buffering data in the shared disk drive, the system also comprising a disk drive bus connecting the computers and the shared disk drive, and disk management software comprising the following functions to be performed by the first computer attempting to perform a disk task:

checking if the second computer has sent to the first computer a notice of changes it has made in the shared disk drive;

in response to detection of the notice, erasing from the cache memory of the first computer the data corresponding to the areas in the shared disk drive that the second computer has changed;

attempting to reserve the disk drive;

if the attempt is successful, performing the disk task, informing the second computer about the areas in the shared disk drive that have been changed by the disk task, and after the disk task, releasing the disk drive; and if the attempt is unsuccessful, sending the second computer an indication that the disk drive is needed; and releasing the disk drive by a reset operation if the second computer does not provide an expected answer to the indication in a predetermined time.

5. A system as claimed in claim 4, wherein the first and second computers communicate via the disk drive bus.

6. A system as claimed in claim 4, wherein the first and second computers communicate via a message bus that is separate from the disk drive bus.

* * * * *